United States Patent
Sayeed

(10) Patent No.: US 12,502,553 B2
(45) Date of Patent: Dec. 23, 2025

(54) OPTIMISED TRACKING OF A REGION OF A PATIENT'S BODY

(71) Applicant: Elekta Limited, Crawley (GB)

(72) Inventor: Abdul Sayeed, Crawley (GB)

(73) Assignee: Elekta Limited, Crawley (GB)

( * ) Notice: Subject to any disclaimer, the term of this patent is extended or adjusted under 35 U.S.C. 154(b) by 353 days.

(21) Appl. No.: 18/041,145

(22) PCT Filed: Aug. 11, 2021

(86) PCT No.: PCT/EP2021/072422
§ 371 (c)(1),
(2) Date: Feb. 9, 2023

(87) PCT Pub. No.: WO2022/034154
PCT Pub. Date: Feb. 17, 2022

(65) Prior Publication Data
US 2023/0310893 A1    Oct. 5, 2023

(30) Foreign Application Priority Data
Aug. 11, 2020    (GB) ..................... 2012455

(51) Int. Cl.
*A61N 5/10*    (2006.01)

(52) U.S. Cl.
CPC ......... *A61N 5/1037* (2013.01); *A61N 5/1049* (2013.01); *A61N 5/1067* (2013.01);
(Continued)

(58) Field of Classification Search
CPC .. A61N 5/1037; A61N 5/1049; A61N 5/1067; A61N 5/1068; A61N 5/107;
(Continued)

(56) References Cited

U.S. PATENT DOCUMENTS

| 6,731,970 | B2 * | 5/2004 | Schlossbauer | A61N 5/1049 600/407 |
| 2006/0004281 | A1 * | 1/2006 | Saracen | A61B 5/1127 600/414 |

(Continued)

FOREIGN PATENT DOCUMENTS

| WO | WO-2017130140 A1 * | 8/2017 | ........... A61B 6/5288 |
| WO | WO-2019027947 A1 | 2/2019 | |

OTHER PUBLICATIONS

"British Application Serial No. 2012455.5, Examination Report dated Jan. 27, 2021", (Jan. 27, 2021), 6 pgs.

(Continued)

*Primary Examiner* — Mark R Gaworecki
(74) *Attorney, Agent, or Firm* — Schwegman Lundberg & Woessner, P.A.

(57) ABSTRACT

Disclosed herein is a medical device for tracking movement of a region of a patient's body. The region has a range of motion, for example a range of respiratory motion. The device comprises a controller configured to determine a motion of the region based on one or more initial images depicting at least part of the region. The controller is further configured to predict, based on the determined motion, a motion event time at which at least one property associated with the motion or position of the region will meet at least one criterion, wherein the at least one criterion comprises the region being located at a particular point in its range of motion. The controller is further configured to determine, based on the predicted motion event time, at least one subsequent image capture time at which at least one subsequent image should be captured.

22 Claims, 8 Drawing Sheets

(52) U.S. Cl.
CPC ...... *A61N 5/107* (2013.01); *A61N 2005/1056* (2013.01); *A61N 2005/1059* (2013.01); *A61N 2005/1061* (2013.01); *A61N 5/1068* (2013.01); *A61N 2005/1091* (2013.01)

(58) Field of Classification Search
CPC .... A61N 2005/1056; A61N 2005/1059; A61N 2005/1061; A61N 2005/1091
See application file for complete search history.

(56) References Cited

U.S. PATENT DOCUMENTS

| | | | |
|---|---|---|---|
| 2010/0061515 A1* | 3/2010 | Shukla | A61N 5/1049 378/98.2 |
| 2012/0316425 A1 | 12/2012 | Raleigh et al. | |
| 2017/0216627 A1 | 8/2017 | Brooks et al. | |
| 2018/0200535 A1 | 7/2018 | Froehlich et al. | |
| 2018/0289982 A1 | 10/2018 | Sayeh et al. | |
| 2019/0220986 A1* | 7/2019 | Magro | A61B 6/032 |
| 2019/0223278 A1* | 7/2019 | Jordan | A61B 6/582 |
| 2020/0238102 A1* | 7/2020 | Lamb | G16H 50/50 |

OTHER PUBLICATIONS

"International Application Serial No. PCT/EP2021/072422, International Search Report dated Dec. 13, 2021", (Dec. 13, 2021), 6 pgs.
"International Application Serial No. PCT/EP2021/072422, Written Opinion dated Dec. 13, 2021", (Dec. 13, 2021), 8 pgs.
"European Application No. 21 766 129.7, Examination Report dated Aug. 27, 2025", (Aug. 27, 2025), 4 pgs.

* cited by examiner

OPTIMISED TRACKING OF A REGION OF A PATIENT'S BODY

PRIORITY APPLICATIONS

This application is a U.S. National Stage Filing under 35 U.S.C. § 371 from International Application No. PCT/EP2021/072422, filed on Aug. 11, 2021, and published as WO2022/034154 on Feb. 17, 2022, which claims the benefit of priority to British Application No. 2012455.8, filed on Aug. 11, 2020; the benefit of priority of each of which is hereby claimed herein, and which applications and publication are hereby incorporated herein by reference in their entireties.

This disclosure relates to a medical device, such as a radiotherapy device, and in particular to a medical device and related methods for tracking a region of a patient's body.

BACKGROUND

Radiotherapy can be described as the use of ionising radiation, such as X-rays, to treat a human or animal body. Radiotherapy is commonly used to treat tumours within the body of a patient or subject. In such treatments, ionising radiation is used to irradiate, and thus destroy or damage, cells which form part of the tumour.

Modern radiotherapy treatment uses techniques to reduce the radiation dose given to healthy tissue, to thereby provide a safe treatment. For example, a standard approach to minimising a radiation dose received by healthy tissue surrounding a target region is to direct the radiation towards the target region from a plurality of different angles, for example by rotating a source of radiation around the patient by use of a rotating gantry. In this way, a cumulative radiation dose may be built up at the target region. However, since the radiation is applied from a plurality of different angles, the same, high, cumulative radiation dose is not built up in the healthy tissue.

However, patient movement during treatment such as breathing, coughing, swallowing, etc. can result in movement of the tumour. Such motions during a treatment session may be referred to as intrafractional motions, and these motions can affect the dose applied to different regions of the patient's body. In other words, movement of the patient during radiotherapy treatment can reduce the effectiveness of the treatment by reducing the dose applied to the tumour, and may cause damage to healthy tissue.

Known techniques to address the problems caused by intrafractional motions include training a patient's breathing, or asking the patient to hold their breath during radiotherapy treatment. In such techniques, the patient's breathing is adjusted based on the requirements of the treatment. However, this may be uncomfortable or impossible for certain patients, and often restricts the time during which radiation can be applied.

Techniques which do not involve training a patient's breathing include respiratory gating and tracking techniques. Respiratory gating techniques may involve dividing a patient's breathing cycle into two or more regions, e.g. a first, optimal region in which radiation should be applied, and a second, suboptimal region in which radiation should not be applied for safety reasons. In response to sensing that the patient's breathing cycle has entered the suboptimal region, the application of radiation is halted (gated). Respiratory gating techniques involve making assumptions about the relationship between the movement of the patient's body throughout their respiratory cycle and the movement of the tumour. Information about the movement of the tumour may be acquired by extrapolating from surrogate respiration signals, which may be acquired by observing the movement of the patient's chest using cameras, or using external markers or strain gauges applied directly to the patient. However, the correlation between the surrogate signal and movement of the tumour may not be accurate.

Tracking techniques involve adjusting the direction, shape, or other properties of the therapeutic beam based on the movement of the tumour. For example, the leaves of a multi-leaf collimator may be moved in order to adjust the shape of the treatment beam in accordance with movement of the tumour. However, in order to make use of tracking techniques, information about the movement of the target region must be acquired. Radiotherapy devices may be equipped with an imaging apparatus and, for example, four-dimensional computed tomography (4DCT) may be used to track the tumour or target region. This imaging modality may be used to track the tumour with acceptable accuracy, but the imaging modality has a finite acquisition time. This means that the target region position as determined by 4DCT is an average position of the tumour during the acquisition time. Tracking techniques based on 4DCT therefore have the potential to introduce minor inaccuracies to a patient's treatment when used to control radiotherapy.

To date, tracking a target region based on 2D (projection) images taken by the KV imager has not been adopted for the purpose of tracking a target region, because it has been thought that it would be necessary to take a large number of KV images, at short regular intervals, in order to track the target region with sufficient accuracy. This would increase the dose received by the patient to unacceptable levels.

The present invention seeks to address these and other disadvantages encountered in the prior art.

SUMMARY

An invention is set out in the accompanying claims. Aspects of the invention are set out in the independent claims, with optional features being set out in the dependent claims.

According to an aspect, a medical device for tracking movement of a region of a patient's body is provided. The region has a range of motion, for example a range of respiratory motion. The device comprises a controller configured to determine a motion of the region based on one or more initial images depicting at least part of the region. The controller is further configured to predict, based on the determined motion, a motion event time at which at least one property associated with the motion or position of the region will meet at least one criterion, wherein the at least one criterion comprises the region being located at a particular point in its range of motion. The controller is further configured to determine, based on the predicted motion event time, at least one subsequent image capture time at which at least one subsequent image should be captured.

According to another aspect, a method for tracking a region of a patient's body is provided. The region has a range of motion, for example a range of respiratory motion. The method comprises receiving a plurality of images, each of the plurality of images depicting at least part of the region and each of the plurality of images having been taken at a respective image capture time. The method further comprises determining, based on the plurality of images and the respective image capture times, a motion of the region between the image capture times; predicting, based on the determined motion, a motion event time at which at least one property associated with the motion will meet at least one criterion. The at least one criterion comprises the region being located at a particular point in its range of motion. The method further comprises determining, based on the predicted motion event time, at least one subsequent image capture time at which a subsequent image should be captured.

According to another aspect, a computer readable medium is provided. The medium comprises computer executable instructions which, when executed by the computer, cause the computer to receive a plurality of images, each of the plurality of images depicting at least part of the region and each of the plurality of images having been taken at a respective image capture time; determine, based on the plurality of images and the respective image capture times, a motion of the region between the image capture times; predict, based on the determined motion, a motion event time at which at least one property associated with the motion will meet at least one criterion; and determine, based on the predicted motion event time, at least one subsequent image capture time at which a subsequent image should be captured.

According to another aspect, a medical device for tracking movement of an internal region of a patient's body is disclosed. The device comprises a controller configured to generate a patient movement model based on a plurality of images depicting at least part of the region, the plurality of images being taken using an imaging apparatus comprising a source of imaging radiation; and a surrogate signal indicative of movement of the patient's surface anatomy. The patient movement model enables estimation of the position of the region as a function of the surrogate signal and/or as a function of time. The controller is also configured to: estimate, using the patient movement model, a motion event time at which the position of the region will meet at least one criterion; and determine, based on the predicted motion event time, at least one subsequent image capture time at which at least one subsequent image should be captured using the imaging apparatus.

According to another aspect, a method for tracking movement of an internal region of a patient's body is disclosed. The method comprises generating a patient movement model based on: a plurality of images depicting at least part of the region, the plurality of images being taken using an imaging apparatus comprising a source of imaging radiation; and a surrogate signal indicative of movement of the patient's surface anatomy. The patient movement model enables estimation of the position of the region as a function of the surrogate signal and/or as a function of time. The method further comprises estimating, using the patient movement model, a motion event time at which the position of the region will meet at least one criterion; and determining, based on the predicted motion event time, at least one subsequent image capture time at which at least one subsequent image should be captured using the imaging apparatus.

According to another aspect, a computer readable medium is provided. The medium comprises computer executable instructions which, when executed by the computer, cause the computer to generate a patient movement model based on a plurality of images depicting at least part of the region, the plurality of images being taken using an imaging apparatus comprising a source of imaging radiation; and a surrogate signal indicative of movement of the patient's surface anatomy. The patient movement model enables estimation of the position of the region as a function of the surrogate signal and/or as a function of time. The controller is also configured to: estimate, using the patient movement model, a motion event time at which the position of the region will meet at least one criterion; and determine, based on the predicted motion event time, at least one subsequent image capture time at which at least one subsequent image should be captured using the imaging apparatus.

Features of the various aspects can be used interchangeably, as appropriate, and this would be understood by the skilled person.

FIGURES

Specific embodiments are now described, by way of example only, with reference to the drawings, in which:

FIGS. 1a-e depict a radiotherapy device or apparatus according to the present disclosure.

DETAILED DESCRIPTION

The present application relates to methods for tracking the motion of an object or item. The methods may be used for any application scenario in which the tracking of an item or object is useful. The method is particularly useful for tracking a target region of a patient's body, for example for diagnostic purposes. The present application also relates to a medical device capable of performing the disclosed methods.

A particularly beneficial use of the present methods is their application to the field of radiotherapy. Image-guided radiotherapy (IGRT) can be described as the use of imaging as part of radiotherapy to improve the precision and accuracy of treatment delivery. Modern radiotherapy devices typically comprise an imaging apparatus. Images may be taken immediately before treatment begins, which may then be used to position the patient on the table accurately with respect to a treatment plan. Images may even be taken during treatment, which may be used to update the radiotherapy treatment. IGRT may therefore be used to treat tumours while taking into account movement of the patient. This is particularly important for tumours which change position as the patient breathes. Using tracking techniques it is possible to, for example, halt the application of radiation when the images indicate a significant volume of the tumour is no longer directly in the path of the beam of therapeutic radiation.

Different imaging modalities may be used as part of IGRT, for example ultrasound and MRI. Ultrasound and MRI are non-ionising modalities and therefore do not give a radiation dose to the patient. However, kV imaging makes use of ionising radiation to obtain an image. For this reason, to date, kV images have not been adopted in tracking within IGRT as it has been thought that to do so would pass on a significant dose of radiation to the patient.

Figure 2A:
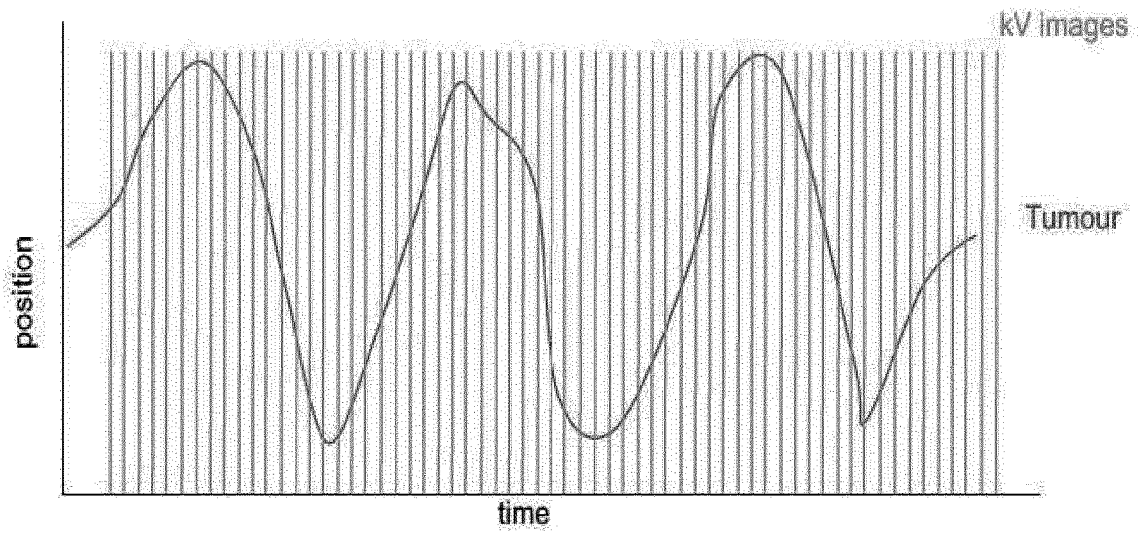
FIG. 2a depicts a graph showing the timing of KV images with tumour movement according to a prior tracking method.

Reference is made to FIG. 2a, which is a graph showing an image acquisition scheme according to the only manner in which it has been thought, to date, that kV images could be incorporated into a tracking technique suitable for use in radiotherapy. The graph shows the movement of a tumour over time, with time along the x axis and position along the y axis. The curved line depicts the motion of the tumour as the patient moves. The majority of this movement is associated with the patient's respiration cycle, and hence the curve has a rough periodicity. The vertical lines indicate times at which kV images are taken. The acquisition frequency, or frame rate, of the kV imaging is regular, and reasonably high, in order to ensure that a potentially important change in tumour position or change in the tumour motion is not missed. This is particularly important if the resulting kV images are to be used to inform and update a radiotherapy treatment plan. A problem with this technique, however, is that the dose given to the patient is unacceptably high.

Figure 2B:
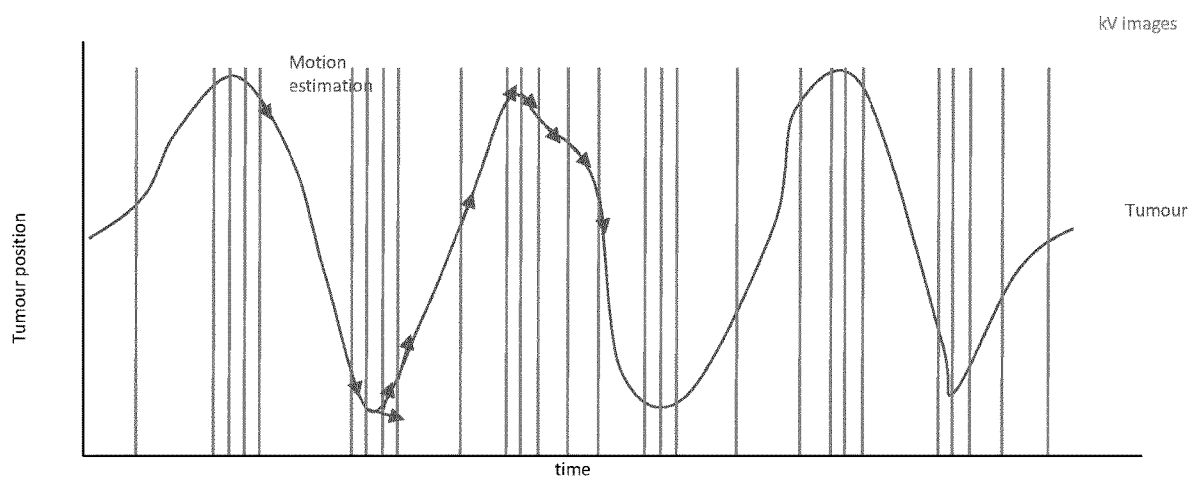
FIG. 2b depicts a graph showing the timing of KV images with tumour movement according to the present method.

Reference is now made to FIG. 2b, which is a similar schematic graph to that of FIG. 2a and shows the movement of a tumour over time. However, here, the acquisition of kV images is controlled by methods of the present disclosure. Instead of kV images being taken regularly and at a high frame rate, motion estimation techniques are used in order to inform when the acquisition of a kV image should occur. Based on previously acquired kV images, motion estimation techniques are used to predict when a motion event will occur. For example, one or more motion vectors may be determined for the tumour based on previously acquired kV images, and these motion vectors may be used to predict the future motion of the tumour. Motion estimation techniques can be used to predict a time at which a motion event will occur. For example, motion estimation techniques may be employed to determine a future time at which the tumour will halt motion and become stationary, change direction, or else will be at a particular predetermined location in the patient's body. The next kV image can then be sequenced based on this predicted future event time. For example, it may be determined that the next kV image should be taken just before, at, or just after the predicted motion event time. Accordingly, the present methods allow optimal use to be made of fewer kV images, because the images are only taken at times judged to be the most useful and impactful to the tracking process. Accordingly, the dose to the patient from the kV images is significantly reduced, while a high response time is maintained for any changes in tumour motion.

While reference is made to tracking a tumour, any region of the patient's body may be tracked. For example, organs at risk (OARs) are regions of tissue which should receive a minimal dose of radiation during radiotherapy for clinical reasons. OARs may, for example, be in the vicinity of the tumour, and an important part of radiotherapy is the delineation of OARs and the management of radiation dose to these tissues. While present methods may be used to track a tumour to ensure it is kept within the path of a treatment beam, or else to halt the application of radiation when the tumour exits the path of the treatment beam, present methods may equally apply to tracking an OAR to ensure it does not enter the path of the treatment beam.

Figure 1A:
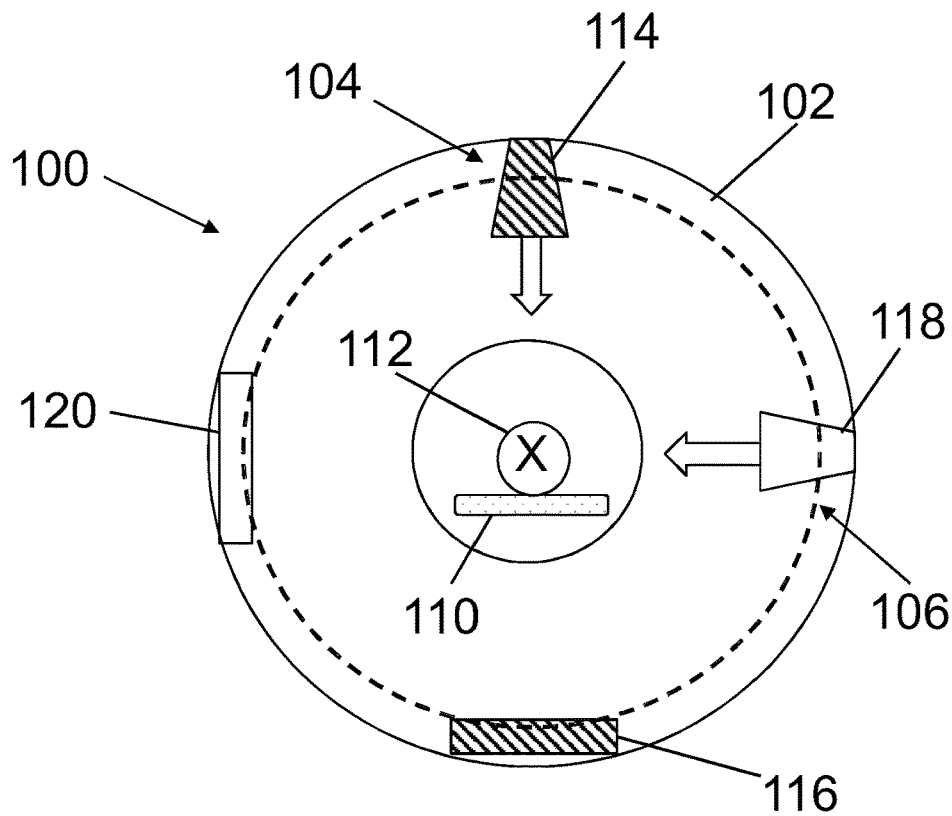

Methods of the present disclosure can be carried out on a medical device comprising an imaging apparatus, for example a radiotherapy device. FIG. 1a shows a suitable radiotherapy device 100. The device 100 can be described as an Image Guided Radiotherapy (IGRT) machine. The IGRT machine 100 comprises a rotatable gantry 102 to which are affixed a treatment apparatus 104 and an imaging apparatus 106. In this example, the treatment apparatus 104 and the imaging apparatus 106 are attached to the gantry, so that they are rotatable with the gantry, i.e. so that they rotate as the gantry rotates. Positioned in a treatment volume of the device is a couch 110 upon which a patient 112 lies during radiotherapy treatment.

Treatment apparatus 104 comprises a treatment beam source 114 and a treatment beam target 116. The treatment beam source 114 is configured to emit or direct therapeutic radiation, for example MV energy radiation, towards patient 112. As the skilled person will appreciate, the treatment beam source 114 may comprise an electron source, a linac for accelerating electrons toward a heavy metal, e.g. tungsten, target to produce high energy photons, and a collimator configured to collimate the resulting photons and thus produce a treatment beam. Once the treatment radiation has passed from the source 114 and through the patient 112, the radiation continues towards treatment beam target 116, where it is blocked/absorbed. The treatment beam target 116 may include an imaging panel (not shown). The treatment beam target may therefore form part of an electronic portal imaging device (EPID). EPIDs are generally known to the skilled person and will not be discussed in detail herein.

Imaging apparatus 106, otherwise known as an imaging system 106, comprises an imaging beam source 118 and an imaging panel 120. The imaging beam source 118 is configured to emit or direct imaging radiation, for example X-rays/kV energy radiation, towards the patient 112. As the skilled person will appreciate, the imaging beam source 118 may be an X-ray tube or other suitable source of X-rays. The imaging beam source 119 is configured to produce kV energy radiation. Once the imaging radiation has passed from the imaging beam source 118 and through the patient 112, the radiation continues towards imaging panel 120. The imaging panel 120 may be described as a radiation detector, or a radiation intensity detector. The imaging panel 120 is configured to produce signals indicative of the intensity of radiation incident on the imaging panel 120. In use, these signals are indicative of the intensity of radiation which has passed through a patient 112. These signals may be processed to form an image of the patient 112. This process may be described as the imaging apparatus 106 and/or the imaging panel 120 capturing an image. By taking images at multiple angles around the patient it is possible to produce a 3D image of the patient, for example using tomographic reconstruction techniques.

In the illustrated example, the treatment apparatus 104 and imaging apparatus 106 are mounted on the gantry such that a treatment beam travels in a direction that is generally perpendicular to that of the imaging beam.

Figure 1B:
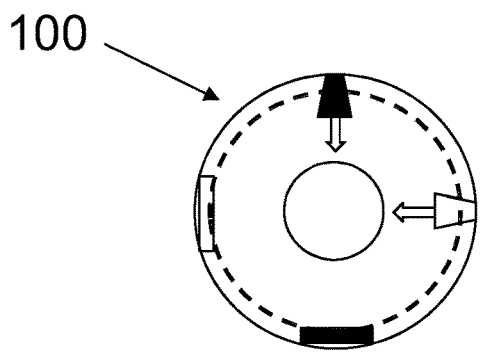
Figure 1C:
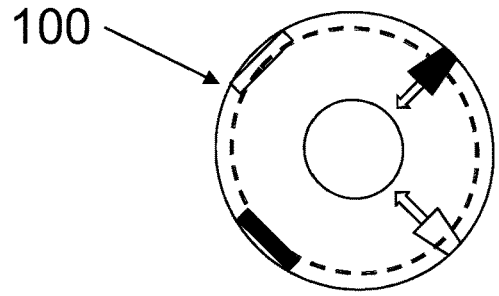
Figure 1D:
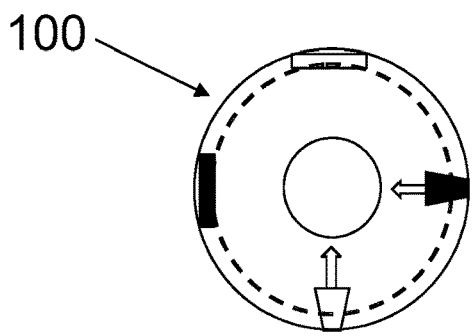
Figure 1E:
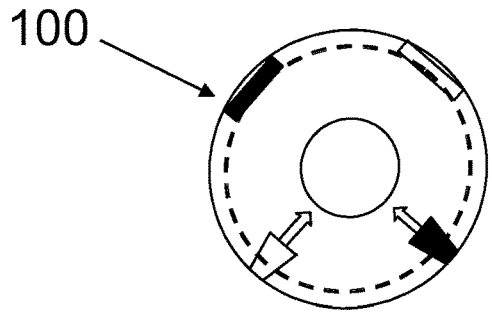

Because the gantry 102 is rotatable, the treatment beam can be delivered to a patient from a range of angles. Similarly, the patient can be imaged from a range of angles. See for example FIGS. 1b-2e, each of which shows the gantry 102 of FIG. 1a at a different rotation angle. In FIG. 1b, the gantry is positioned at a 'first' gantry rotation angle, in which the treatment source 114 directs the treatment beam towards the patient in a vertical/downwards direction and in which the imaging source 118 directs the imaging beam towards the patient in a horizontal/right-to-left' direction. In FIG. 1c, the gantry has been rotated 45-degrees clockwise, into a 'second' rotation angle. In FIG. 1d, the gantry has been rotated a further 45-degrees clockwise (i.e. 90-degrees clockwise relative to FIG. 1b) into a 'third' rotation angle, so that the treatment source 114 directs the treatment beam towards the patient in a horizontal/'right-to-left' direction and in which the imaging source 118 directs the imaging beam towards the patient in a vertical/upwards direction. Finally, in FIG. 1*e*, the gantry has been rotated a further 45-degrees clockwise (i.e. 135-degrees clockwise relative to FIG. 1*b*) into a 'fourth' rotation angle.

As the skilled person will appreciate, the gantry 102 can be rotated to any of a number of discrete angular positions relative to a patient. The treatment apparatus 104 may direct radiation toward the patient at each or a number of these discrete angular positions, according to a treatment plan. The treatment apparatus 104 may even be used to continuously irradiate a patient at all rotation angles as it is rotated by the gantry 102. The angles from which radiation is applied, and the intensity and shape of the therapeutic beam, may depend on a specific treatment plan pertaining to a given patient.

The device 100 may additionally comprise a surface scanning system. A surface scanning system is a system configured to scan a patient while the patient is positioned on the patient positioning surface. In an example, the surface scanning system may comprise a processor, a pattern projector, and at least one camera or other detecting means. The pattern projector is configured to project a 2D or 3D pattern onto the patient from above. The camera, or a plurality of cameras, observes the pattern projected onto the patient, and the processor is configured to determine, based on the detected/observed projected pattern, information associated with the position of the patient. Surface scanning systems are known in the art and may be used to track motion of the patient. The surface scanning system may be used to determine a surface representation based on detection of the projected 2D or 3D pattern onto the patient. The surface representation may be described as a computer model which represents movement of the patient. The surface representation algorithm may be any of a feature, point or model-based method, or a technique based on global similarity. Such algorithms are known to the skilled person.

Alternatively, the surface scanning system needn't comprise a pattern projector, but may instead monitor the movement of the patient's surface anatomy using a camera and known video analysis techniques.

The device 100 additionally comprises a controller (not shown). The controller is a processor or a processing device configured to control the device 100. The controller is coupled with a computer readable storage medium comprising or storing instructions which, when executed by the controller, cause the controller to carry out any method or methods disclosed herein. Accordingly, the approaches described herein may be embodied on the computer-readable medium, which may be a non-transitory computer-readable medium. The computer-readable medium carrying computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

The controller is configured to send control signals to multiple different components of the device 100, for example those described above and elsewhere herein. In particular, the controller is configured to send instructions to the imaging apparatus in order to instruct that an image be taken at a particular time, and/or is configured to update image sequencing information such that the times at which images are captured can be controlled by the controller. The controller is also configured to send control signals to the treatment apparatus in order to effect changes in radiotherapy treatment. The controller also collects data indicative of the performance and actions of various components of the device 100. For example, the controller controls rotation of the gantry and records the angle to which the gantry has been rotated.

Figure 3:
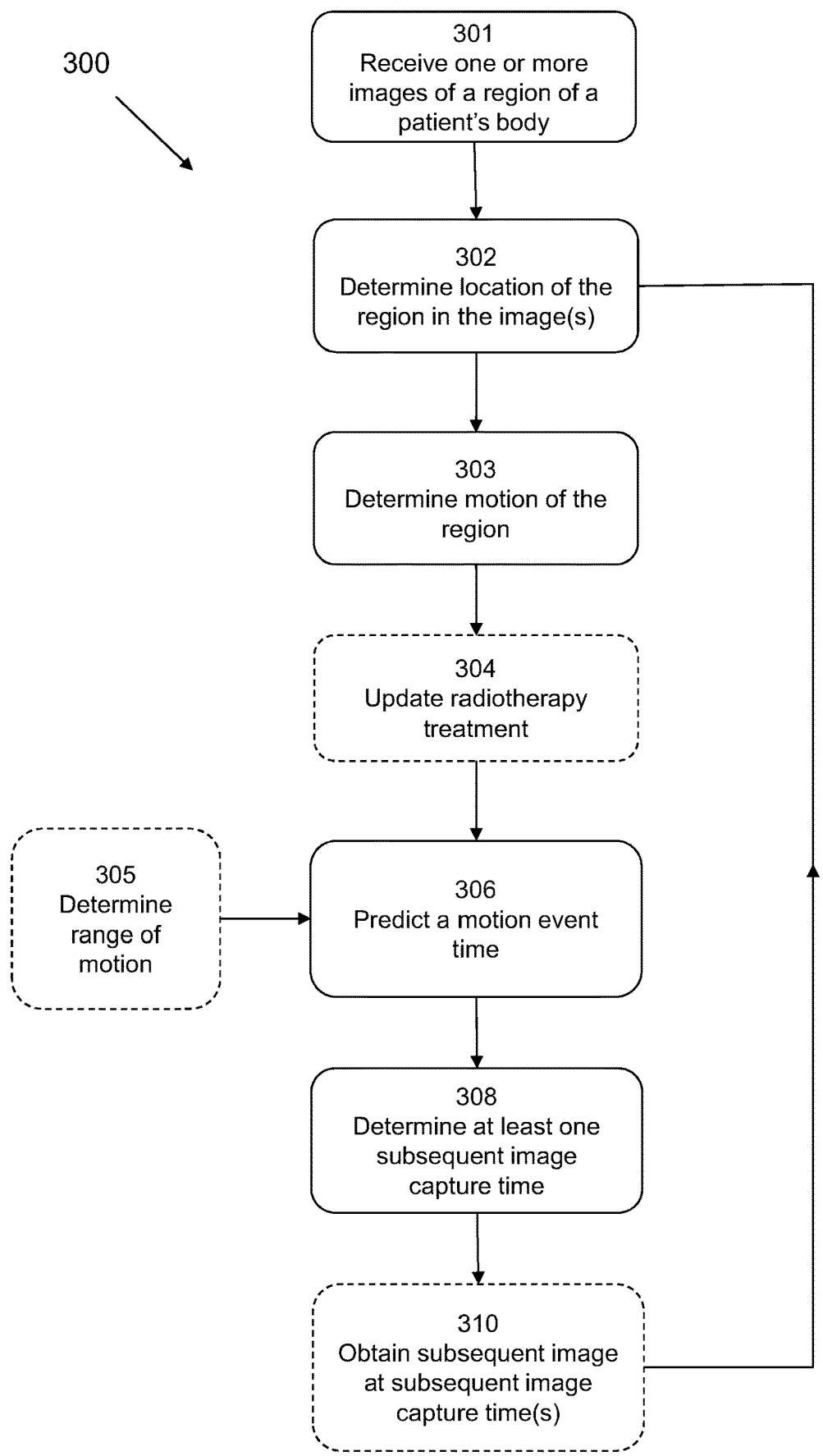
FIG. 3 depicts a disclosed method.
Figure 4A:
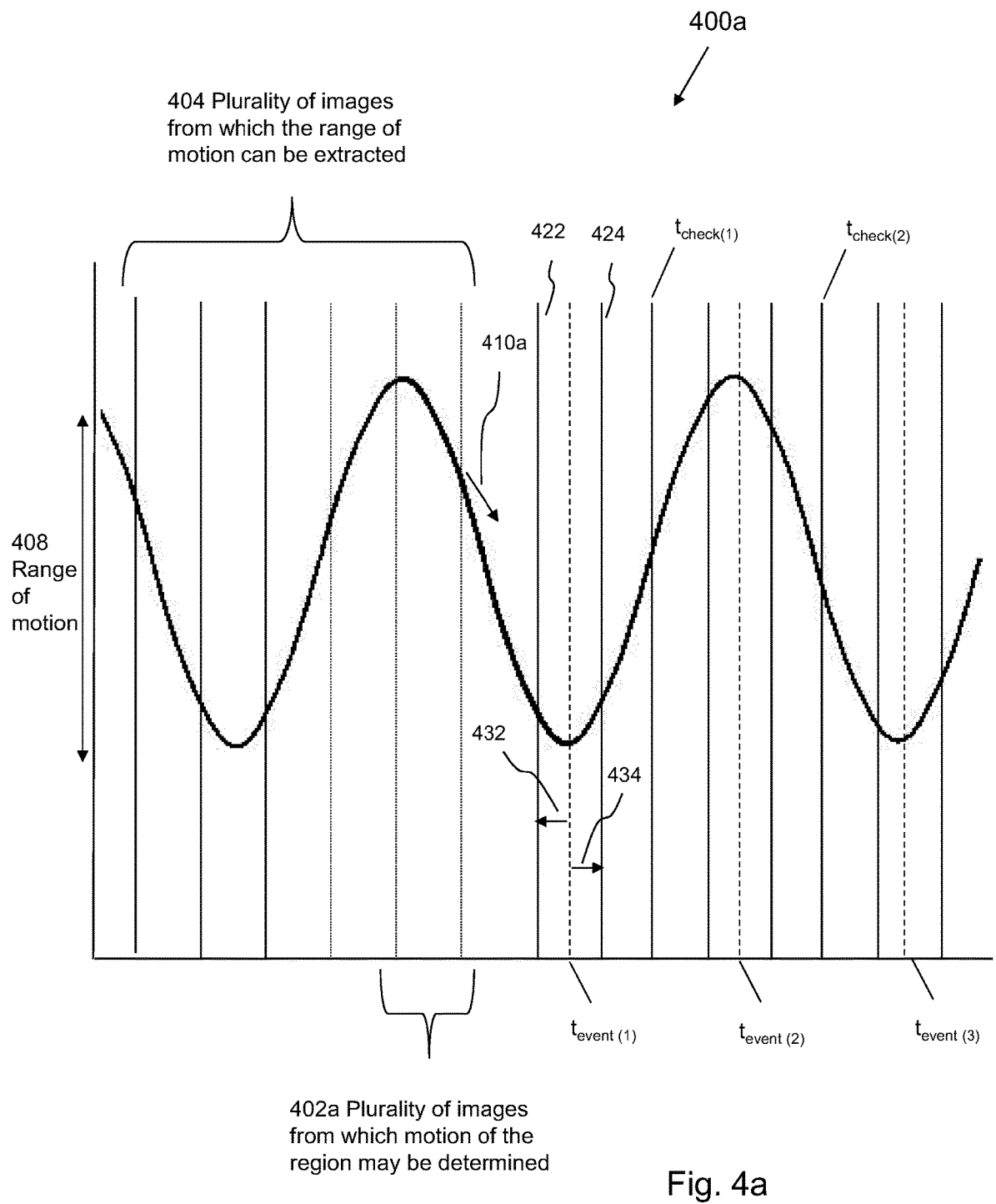
FIGS. 4a and 4b depict the timing of images based on different motion events, according to the present disclosure.
Figure 4B:
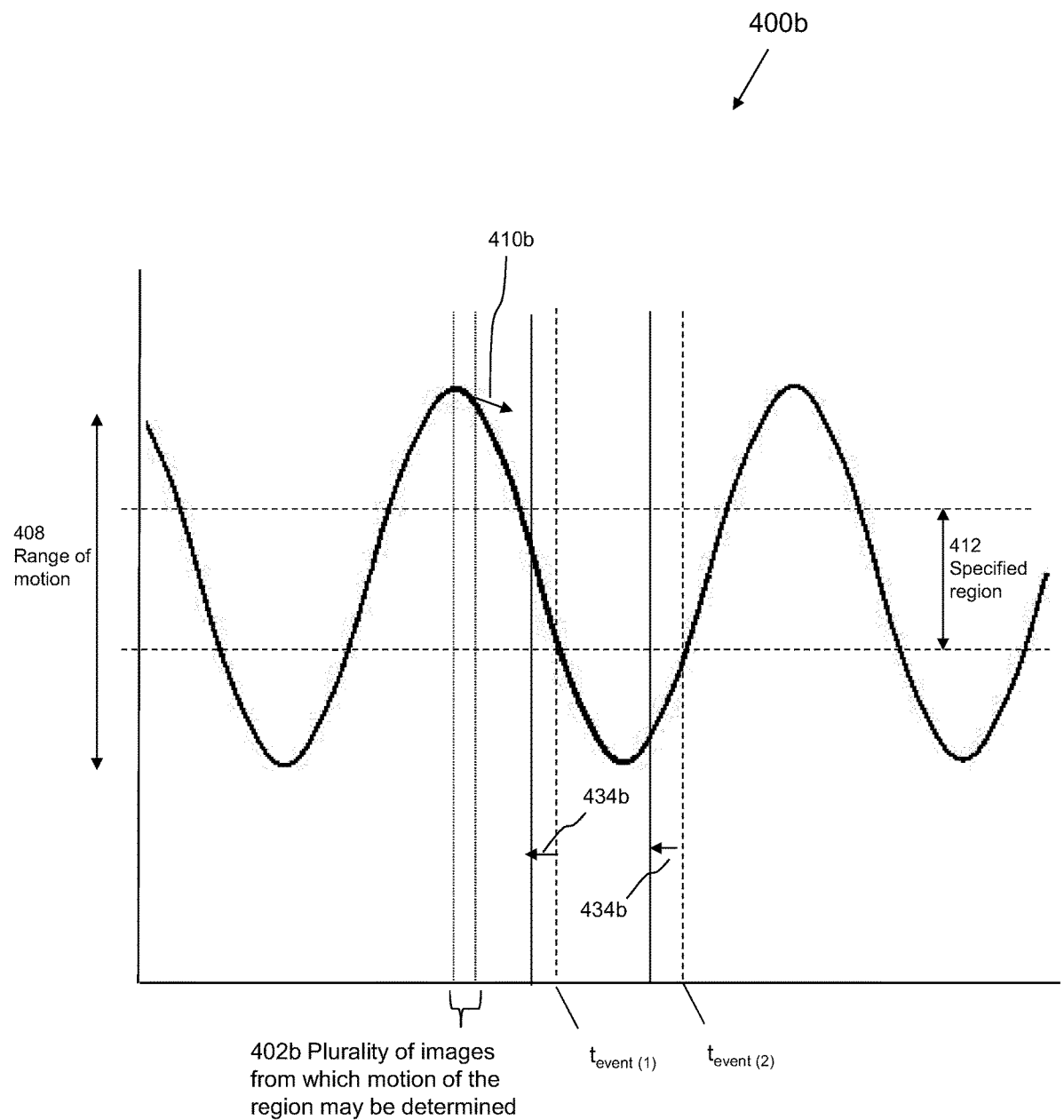

FIG. 3 is a flowchart depicting a method 300 of tracking a region of a patient's body according to the present disclosure. FIGS. 4*a* and 4*b* show graphs 400*a*, 400*b*. These graphs show displacement of the region of the patient's body on the y axis with time along the x axis. Unbroken vertical lines depict times at which images are taken. Dashed vertical lines indicate times at which it has been predicted that a motion event will occur. FIGS. 4*a* and 4*b* show images being taken according to different acquisition schemes, which are created using different image capture criteria, as will be explained below. Reference will be made to FIGS. 4*a* and 4*b* as appropriate in the following description of the flowchart of FIG. 3.

While displacement is depicted in a single direction on the graphs for simplicity, it should be appreciated that motion of the region may take place in three dimensions and therefore displacement may be a three dimensional vector quantity. Also, while reference is made to displacement, the disclosed methods may equally make use of a scalar position. The graphs shown in FIGS. 2*a*, 2*b*, 4*a* and 4*b* describe the change in position of a region of a patient's body with time.

At block 301, one or more images of a region of a patient's body are received. The one or more images may be a plurality of images. Each image depicts at least part of the region. Each of the images has its own associated image capture time, as can be appreciated from FIGS. 4*a* and 4*b*. The images may have been obtained via an imaging apparatus configured to emit imaging radiation, and/or ionising radiation. The images may be kV images, i.e. may have been obtained via a kV imaging apparatus such as an X-Ray or CT imaging apparatus. In an example, there are two images comprised within the plurality of images: a first image taken at a first image capture time and a second image taken at a second image capture time. An example of a suitable plurality of images is depicted in FIG. 4*a* via reference numeral 402*a*, and in FIG. 4*b* via reference numeral 402*b*. At block 302, the location of the region in the one or more images is determined. The location is determined automatically. This step can be performed using known auto-segmentation or auto-contouring techniques.

At block 303, a motion of the region is determined. The motion is determined based on the location of the region in the image(s) determined at block 302 along with the relevant image capture times. The motion may be determined based on either a subset, or all, of the images received at block 301. A suitable subset may be the two most recent images received at the time the determination at 303 is made. The determined motion can be described as a motion between the image capture times of the images can be determined. In particular implementations, determining the motion comprises determining a parameter which describes the motion of the region. A suitable parameter is a motion vector. A set of motion vectors may be determined, with each motion vector describing motion of the region between two respective image capture times.

Determining the motion may comprise calculating or determining a mathematical object or function which can be used to determine the position or velocity of the region as a function of time, for example calculating a motion vector or a patient movement model.

Determining the motion may comprise determining the motion based on the location of the region of the patient's body in each of the received images and the respective image capture times of each image. Using one or more motion estimation techniques, at least one motion vector is determined for the region based on the images, e.g. based on the first and the second image. The at least one motion vector comprises a vector velocity value. In other words, determining a motion of the region may comprise determining both a direction of motion and a speed of motion for the region. For example, in an implementation which makes use of two images (402a, or 402b) as shown in FIGS. 4a and 4b, the region of the patient can be identified in the first image and the second image using known image analysis or motion estimation techniques. Based on the determined positions of the region in the two images, a motion vector 410a, 410b can be determined. For example, if the region has moved 25 pixels between the first time and the second time, then the speed of movement can be simply calculated as 25 pixels/$(t_2-t_1)$. For a medical device comprise an imaging apparatus, the field of view of the images is known to a high level of accuracy. As the field of view of the images is known, it is also possible to represent this speed value in units such as mm/s or cm/s. An example of determining a motion vector is described in relation to FIGS. 6a and 6b.

Figure 6A:
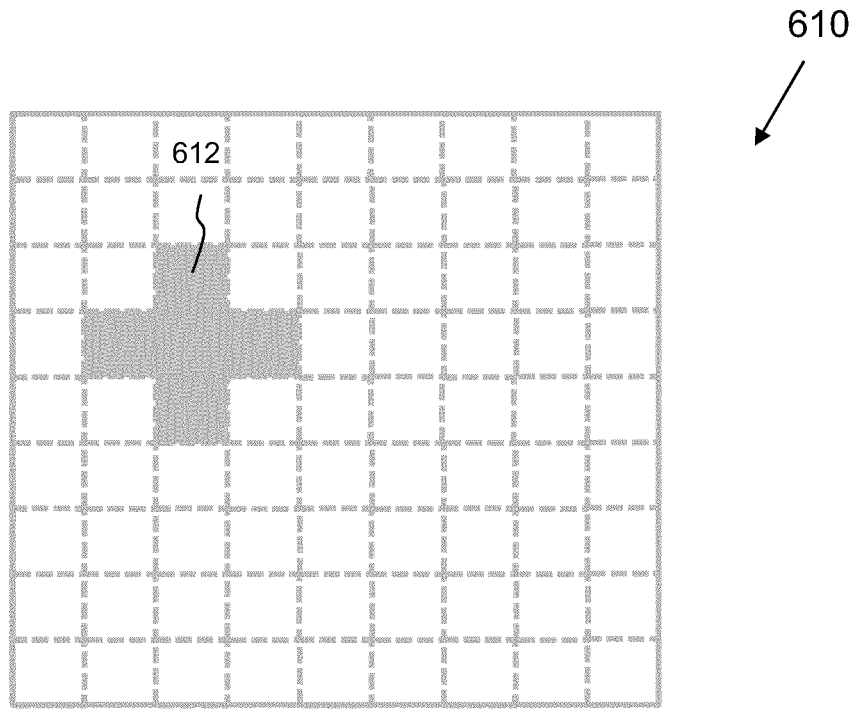
FIGS. 6a and 6b depict the movement of an object between a first time at which a first image is taken and a second time at which a second image is taken.
Figure 6B:
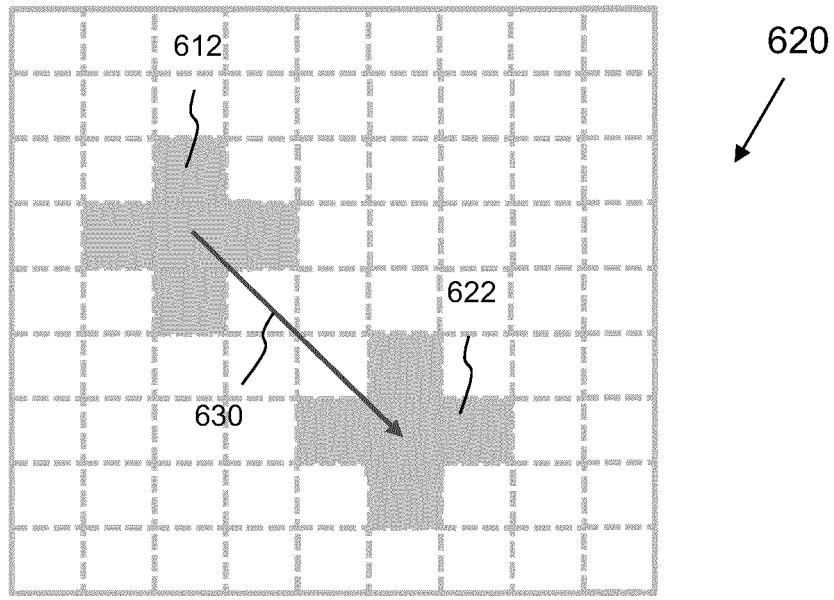

In an example, motion estimation can be performed for each pixel in the image received at block 301 in order to acquire a motion vector for each pixel in the manner disclosed herein, for example with respect to FIGS. 6a and 6b. A region growing method/algorithm can be applied in order to determine which motions of nearby pixels are similar. Pixels which are nearby one another (e.g. within a distance threshold) and which have a similar motion vector (e.g. within a motion threshold) may be grouped together and determined to be associated with the same region of the patient's anatomy. This analysis can be based on a pre-segmented original image.

While reference has been made to determining one motion vector, it will be appreciated that several motion vectors associated with motion of the region may be determined. This is useful in situations where the region is large and cannot be accurately described with a single motion vector, for example a long tumour which moves in different directions as the patient breathes. Implementations in which multiple motion vectors are calculated better take into account the fact that tissues in the body are not typically rigid and so do not move as solid objects. For deformable regions of the patient's body it is possible to track the region using multiple motion vectors, which would describe deformation of the region as the patient moves. In an example where the intention is to track movement of the patient's heart, multiple motion vectors could be used. A motion vector which tracks movement of the centre of the heart may suggest that the heart is not exhibiting significant movement with time, but one or more motion vectors associated with the walls and other cardiac tissue of the heart will give a better indication of the movement of the heart with time.

At block 304, optionally, radiotherapy treatment is updated. Treatment may be updated based on one, or both, of the location of the region in the images determined at block 302 and the motion of the region determined at block 303. Updating radiotherapy based on the location and motion of the tumour or other target region in images taken during treatment is known and can be performed using known techniques. This ensures the treatment adapts as the target position changes during treatment.

For example, the target may move due to movement of the patient such as breathing, coughing, swallowing, etc. Such motions during a treatment session may be referred to as intrafractional motions. Updating the radiotherapy treatment may comprise adjusting one or more parameters which affect the delivery of radiation to the patient. For example, a processor may be configured to control at least one of the following based on the determined motion and/or the location of the region in the images: a gating of a radiation beam; the shape of the beam via adjusting a multi-leaf collimator (MLC); or a movement of a patient supporting system.

Optionally, at block 305, a range of motion associated with the region is determined. This may comprise determining range of motion data, which is indicative of the range of motion which the region moves through. The determination at block 305 may take place at any suitable time, for example before or during treatment. The determination at block 305 may be performed before any of blocks 301 and 303. FIGS. 4a and 4b show movement of a tumour over time as it moves periodically (or semi-periodically) through a range of motion 408 defined by a maximum and a minimum displacement value.

A number of methods can be used to determine the range of motion. For example, a second plurality of images may be obtained, from which the range of motion can be extracted (the use of 'second' is to differentiate from a 'first' plurality of images which may be received at block 301). A suitable second plurality of images, from which range of motion data can be estimated/extracted, is depicted in FIG. 4a by reference to the numeral 404. The range of motion 408 of the region is depicted via the double-headed arrow that extends in the y-direction. The range of motion extends between the minimum and the maximum displacement of the tumour or other region of the patient's body. The images of the second plurality of images are taken as the region, e.g. a tumour, moves through its range of motion. In the illustrative example depicted, the plurality of images comprises 6 images taken at various points in the patient's breathing cycle. There may be overlap between the first and second plurality of images such that the first plurality of images 402a (from which motion of the region may be determined) is wholly or partly encompassed by the second plurality of images 404 (from which motion of the region may be determined). As can be appreciated from FIG. 4a, the first and second image which comprise the first plurality of images 402a also form part of the second plurality of images 404. By using the images of the first plurality of images 402a for more than one purpose, i.e. to extract range of motion data and to determine a motion of the region, optimal use of images is achieved and radiation dose to the patient is reduced. Determining the range of motion may comprise manually segmentation the images, or using auto-segmentation techniques, to determine the location of the tumour in each image, and then comparing the locations of the tumour in the images in order to determine the location extremes.

The range of motion data also be determined using a surface scanning system and associated methods. In an example, the patient may be positioned on a patient position surface (otherwise known as a couch or table) and imaged using the surface scanning system. Continuous scanning allows a surface representation/model of the patient to be generated according to known algorithms, from which the range of motion data can be extracted.

The range of motion data may comprise a minimum and a maximum displacement of the region. In other words, the range of motion data may comprise the extremes of the motion of the region. In particular, if an aim of the method is to take images at particular points in a breathing cycle, the images are taken at particular points throughout the patient's breathing cycle. From these images, a minimum and maximum displacement of the tumour throughout the patient's breathing cycle can be extracted. The motion vectors, or average motion vectors, may also be recorded at the maximum and minimum displacement points.

It is possible to estimate/extract the range of motion of the region using known motion estimation and/or image analysis techniques. The range of motion data may be the maximum and minimum displacement values. For example, co-ordinates of the maximum and minimum displacement values may be determined and recorded and saved as range of motion data. While in the depicted example the plurality of images are obtained over only one movement cycle, it will be appreciated that images may be taken over a number of cycles.

In addition to the maximum and minimum displacement values, multiple displacement values may be recorded over the full cycle of motion such that the range of motion data describes the displacement of the region over the full cycle of motion.

It will be appreciated that, for a radiotherapy device with a rotatable imaging apparatus, the range of motion position values which make up the range of motion data should be recorded in a three-dimensional space rather than, for example, with respect to the 2D surface of the imaging panel.

The range of motion data may comprise maximum and minimum displacements in each of a plurality of directions/dimensions. For example, for the region of the patient, a maximum and minimum displacement may be recorded in an x, y, and z co-ordinate system within the treatment or imaging volume of the medical device. Such a co-ordinate system may be described as a room co-ordinate.

The range of motion data may be described as a movement arc. The movement arc may be comprised if displacement in each of a plurality of dimensions, for example in some or all of x, y and z directions within a three-dimensional co-ordinate system used to define the treatment or imaging volume of the medical device.

Alternative methods of determining range of motion data comprise using non-ionising imaging modalities. For example, MR images of the patient may be available from which the range of motion can be extracted. Alternatively, optical sensors, cameras or ultrasound techniques can be used to obtain the second plurality of images. It is beneficial for the second plurality of images to be taken just before the motion of the region is to be tracked to ensure the range of motion data is accurate and indicative of the range of motion during treatment. Non-imaging techniques may also be used to determine the range of motion/range of motion data, for example a respiratory strain gauge, a strain belt, one or more sensors such as optical sensors, etc.

As will be appreciated from the following description of the method 300, the method may involve continually taking images of a region of a patient's body at times determined by motion estimation data such as a motion vector, and then continuously updating the motion estimation data (e.g. motion vector) based on the newly acquired images to ensure the determined motion of the region is kept up to date. This can be described as tracking movement of the region in real time. If subsequent images suggest that the range of motion data is inaccurate or else no longer representative of the movement of the patient, the range of motion data may be automatically updated.

In an implementation, the position of the region is determined in each subsequent image at block 302 and compared to the range of motion data. If this determination reveals that the region has extended beyond the minimum or maximum displacements indicated by the range of motion data, then the range of motion data can be updated, for example to comprise a new maximum or minimum displacement as appropriate. Alternatively, the range of motion data may be updated only if the region is observed to regularly travel beyond the range of motion data. This may involve comparing to a threshold value, which may be a number of times the region has extended beyond the range of motion determined at 305, or else a number per unit time. Thus. movement of the region is tracked, the determined motion of the target is compared to the range of motion data to determine whether the range of motion data is still appropriate and accurate.

At block 306, a motion event time is predicted. The motion event time is predicted based on the determined motion of the region. The motion event time is a time at which a motion event will occur. A motion event occurs when at least one property associated with the motion and/or location of the region meets a criterion, or meets a combination of criteria. For example, a motion event may occur when a property of the motion changes in a specified way. For example, the velocity might change such that a velocity criterion is met. The criterion could relate to either or both, of the speed or direction of movement.

Motion events may occur when the region reaches particular points in its range of motion, for example the points of maximum and its minimum displacement in the patient's respiration cycle. The maximum and minimum displacement points may be referred to as turning points and can be determined, for example, from the range of motion data. For regions which move as the patient breathes, these maximum and minimum displacements may correspond in time roughly, though not necessarily exactly, with the maximum and minimum points of lung expansion. For periodic movements which generally involve two main directions of movement, for example a positive and a negative direction of movement, these maximum and minimum points of movement may be referred to as turning points.

When predicting when the next turning point or other motion event will occur, the range of motion data may be used. In a simple implementation, the relevant event time to be determined might be the time at which the region is at its maximum displacement. This corresponds at least roughly with the point of maximum inhalation, i.e. when the lungs are at their greatest extension point. Because the velocity of the region at a particular time is known from motion estimation techniques, and because the distance to be travelled can be determined from the range of motion data, an estimate of when the region will reach its maximum displacement can be extracted.

FIG. 4a depicts an image acquisition scheme in which the motion events of interest are particular points in a range of motion associated with the region. In particular, the motion events of interest are the turning points of the motion. A suitable criterion might be that the region has a displacement which matches either its maximum or minimum displacement value, as determined from the range of motion data. In this example, using the determined motion, e.g. a motion vector, and the range of motion data, an event time $t_{event(1)}$ be determined at which the region will arrive at its minimum displacement.

Three different predicted motion event times are depicted on the graph of FIG. 4. These three different predicted motion event times are marked using the notation: $t_{event(identifying\ number)}$.

An alternative criterion for predicting when the region is at a turning point might be that the velocity changes from positive to negative (for example in a co-ordinate system in which zero displacement is at the region's minimum value). A suitable criterion can be described as the direction of motion having changed in a specified way, e.g. by a threshold amount, or the direction being within a specified direction range. For example, the direction of the region can be placed in one of two bins: up or down, or equivalently positive or negative. Predicting a motion event time might therefore comprise predicting when the direction of the region will change from one 'bin' or range of direction values to another.

In order to predict when a change in velocity will occur, it is useful to have determined, at 303, a plurality of different motion vectors at different times. For example, in an implementation, the plurality of images 402a received at block 301 may comprise three images, each taken at a respective image capture time. By determining a first motion vector based on the difference in position of the region between a first and second image, and determining a second motion vector based on the difference in position of the region between the second and a third image, it is possible to determine acceleration information for the region. Accordingly, it is then possible to predict a future motion event time at which the velocity of the region will meet certain criteria, for example when the velocity will change direction at a turning point. Techniques utilising Kalman filters can also be used to determine acceleration information. These techniques are known to the skilled person.

FIG. 4b shows a different image acquisition scheme in which the relevant motion event is the region of the patient entering or exiting a specified region 412 of the patient. The specified region may be a three-dimensional volume within the treatment volume of a radiotherapy device. The region of the patient which is being tracked, for example a tumour or other target region, moves with respect to the specified region, for example as the patient breathes. The size of the specified region is depicted in FIG. 4b using the numeral 412. To determine when to take subsequent images, a motion vector 410b is determined based on a plurality of images 402b. Based on the motion vector 410b it is possible to predict a time $t_{event(1)}$ at which the target region of the patient will exit the specified region 412. While reference is made to the target region exiting the specified region, it can be equivalently predicted at what time the target region will enter the specified region. A predicted motion event time at which the target region of the patient will enter the specified region is shown at $t_{event(2)}$.

Determining when a target region such as a tumour is in a specified region or volume with high accuracy is important when determining when to gate a radiotherapy treatment beam. The image acquisition scheme and method described with respect to FIG. 4b is useful for the purposes of radiotherapy because, typically, it is advantageous to apply the treatment beam while the patient is at the mid-point of their respiration cycle; in other words, when the target region is roughly midway between the minimum and maximum point of its range of respiratory motion. A radiotherapy device may be configured to direct the treatment beam toward the specified region or volume, with the patient being positioned before the treatment such that the tumour or target region aligns with this location. In some implementations, the isocentre of the radiotherapy device may fall within the specified region. The treatment beam can then be gated, i.e. switched off, when the tumour moves outside this specified region/volume by a particular degree. In this way, the radiation dose received by healthy tissue is reduced.

For this reason, a suitable time to take a subsequent image might be, depending on the nature of treatment, the mid-point of the respiration cycle. At this point, the displacement, or position, of the target region will meet the criterion that it is located at the midpoint between minimum and maximum displacement in the range of respiratory motion. The criterion might similarly be that the target region falls within a threshold range or specified region located around the mid-point of the respiratory cycle. In other words, a property associated with the motion of the region (in this case, the position of the region) will meet the criterion of being located at a specified position value (the mid-point), or alternatively the location of the target region will meet the criterion of being within a specified region, where the specified region includes the mid-point.

Based on the above discussion it will be appreciated that, based on the determined motion obtained from motion estimation techniques, it is possible to predict a motion event time at which at least one property associated with the motion will meet at least one criterion. The criterion may be, for example, a velocity criterion, a displacement or location criterion, or an acceleration criterion if multiple motion vectors are acquired from the plurality of images received at block 301.

At block 308, at least one subsequent image capture time is determined. The subsequent image capture time is determined based on the predicted motion event time. The subsequent image capture time is a time at which a subsequent image should be captured. The method may further comprise sequencing the subsequent image(s), e.g. by instructing the imaging apparatus of the medical device to obtain a subsequent image at the subsequent image capture time. At least one subsequent image may then be obtained at the at least one subsequent image capture time (see block 310).

For example, the subsequent image capture time might correspond with the predicted motion event time. In an implementation in which the motion events relate to the turning points of the movement, images could thus be obtained at the turning points. Alternatively or additionally, a motion event may be the region of the patient being located at a pre-specified location, such as a location corresponding with the mid-point of the patient's respiratory cycle. Images can thus be scheduled to be taken at the mid-point of the patient's respiratory cycle.

In another implementation, a subsequent image capture time can be determined to be a specified time before and/or after the predicted motion event time. Such an implementation is depicted in FIG. 4a. Based on motion vector 410a, a turning point is predicted to occur at $t_{event(1)}$. Based on this predicted motion event time $t_{event(1)}$, two subsequent image capture times are determined: the first subsequent image capture time being a first specified time interval 432 before $t_{event(1)}$, and the second subsequent image capture time being a second specified time interval 434 after $t_{event(1)}$.

The specified time intervals 432, 434 may be based on predetermined periodicity data. For example, the periodicity or length of the patient's breathing cycle can be obtained from the second plurality of images 404, and the specified time interval(s) 432, 434 may be determined relative to this length of time. In an example, the first specified time interval 432 might be a small fraction of the patient's total breathing cycle length. In a particular example, the specified time interval might be 5% of the time taken for the patient to complete a full respiratory cycle, such that if a patient's breathing cycle is measured to last 6.0 seconds, a subsequent image is scheduled to occur 0.3 seconds before a predicted motion event takes place.

In an alternative implementation, rather than taking images at a specified time interval before a predicted motion event time, a subsequent image could be scheduled for a time at which the region of the patient will meet a distance or displacement criterion. This may be described as a dynamic threshold, as it will be adjusted depending on the speed/velocity of the region. With reference to FIG. 4a, $t_{event(1)}$ is a predicted motion event time. At this time, it is predicted that a turning point will occur. A subsequent image 422 could be scheduled when the region is expected to be a specified distance away from the turning point. With reference to FIG. 4a, the time difference 432 between the predicted event time $t_{event(1)}$ and the time at which the subsequent image 422 is taken could be based on a position or displacement criterion. Put simply: this implementation involves predicting at what time the target region will be within a threshold distance of the turning point, and scheduling a subsequent image to be taken at that time.

It will be appreciated that, having predicted a motion event time, the at least one subsequent image capture time may be determined in one way, or a combination of different ways. Scheduling subsequent images to be taken at either a threshold time or a threshold distance before a turning point has been described, but different criteria and events may be used.

Thus, it is possible to determine multiple different subsequent image capture times, and the resulting images can serve different purposes. For example, a first image taken at or just before the motion event occurs can be used to obtain an image at a time which will be most useful for updating radiotherapy treatment. A second image can be scheduled to occur just after the motion event at a time most appropriate for updating the determined motion of the target, i.e. at a time which will result in an image most suited for the determination of a new motion vector. Times 432 and 434 can be selected and adjusted based on these aims.

After subsequent image(s) have been obtained at block 310, the locations of the region in each subsequent image is determined at block 302, and the process continues through the steps 302 to 310. In this way, the motion vector is continually updated and kept up to date. In implementations in which the region is being tracked for the purpose of adapting radiotherapy treatment, this method ensures that the treatment is optimised to take into account as intrafractional motions while requiring significantly fewer images to be taken.

As described in relation to block 304, the tracking method can be used to update radiotherapy treatment, in real-time or semi-real time. The treatment is kept up to date by updating the radiotherapy based on the subsequent images captured at the subsequent image capture times. By adjusting the radiotherapy treatment in this way, radiation dose received at the target region can be optimised while minimising radiation dose received by healthy tissue, and in particular minimising radiation dose received by any OARs.

Updating the radiotherapy treatment may comprise adjusting one or more parameters which affect the delivery of radiation to the patient. Updating the treatment may comprise halting (gating) application of the radiotherapy beam based on the subsequent image, and/or may comprise adjusting the shape and/or intensity of the beam. The shape of the beam may be adjusted using a multi-leaf collimator. Accordingly, the positions of the leaves of the MLC may be adjusted according to the subsequent image. Updating the radiotherapy treatment may comprise adjusting the relative positions of the patient and the source of therapeutic radiation, for example by moving the patient positioning surface, and/or by rotating the gantry such that the therapeutic radiation beam is emitted at a different angle with respect to the patient.

The controller instructs the relevant parts of the radiotherapy device to effect the updated radiotherapy treatment. For example, the controller is configured to send control signals to any of the radiation source and its associated control circuitry, collimation components such as the MLC, and components which can effect changes in relative position between the patient and the radiation source such as the patient positioning surface and the gantry rotation mechanism.

As an example, as part of radiotherapy treatment, a source of therapeutic radiation is configured to apply radiation along a beam path within the treatment volume of the radiotherapy device from a particular gantry rotation angle for a specified length of time, in order to supply a particular dose of radiation to a tumour of a patient positioned on the patient positioning surface. Before treatment, the patient is positioned on the patient positioning surface such that the tumour is positioned in the beam path. The MLC is used to shape the radiation such that the dose applied to the tumour or target region is optimised while dose applied to healthy tissue is minimised. In other words, the radiotherapy device is configured to apply radiation to a specified volume of space. However, as described herein, the tumour moves with the patient's breathing, and so the tumour does not occupy the same volume as the specified volume at all times. The present methods can be used to track the tumour and gate (halt) the application of radiotherapy when the tumour leaves the specified volume by a specified amount, or else tack the tumour as the patient breathes by adjusting the MLC leaves.

The present methods can be used to predict when the target region is going to enter, and exit, a predefined volume, and take images of the target region based on these predicted times. Such an implementation can be described with respect to FIG. 4b. FIG. 4b depicts a specified region 412, which may be a volume. The patient is aligned such that the tumour aligns with the specified region 412. The application of radiation should be halted when the target region exits the specified region 412 by a specified degree in order to reduce radiation dose to healthy tissue. The application of radiation should begin again when the target region re-enters the specified region 412 by a specified degree in order to optimise dose applied to the tumour. The determined motion of the tumour, as characterised by motion vectors, can be used to predict when these two events will happen. Knowledge of when these events will happen, or else are likely to happen, allows the tracking of the tumour with sufficient accuracy to allow the beam to be gated successfully, while minimising the number of images required.

The motion vector 410b might suggest that the patient has started to breathe more quickly. A time $t_{event(1)}$ at which the target region will leave the specified region is predicted, and a subsequent image is taken just before this predicted time $t_{event(1)}$ (controlled by specified time interval 434b) to confirm that the target region is exiting, or just about to exit, the specified region. Based on this subsequent image, which confirms that the target region is about to exit the specified region, the application of radiation to the specified region 412 is halted.

Based on the subsequent image, plus any other images taken (not shown in FIG. 4b), it can also be predicted when the target region will re-enter the specified region. This predicted motion event at time $t_{event(2)}$ is depicted in FIG. 4b. Again, an image is taken just before the predicted motion event time $t_{event(2)}$ to confirm the motion estimate tracking is correct. Based on this image, the radiotherapy treatment is updated such that radiation is re-applied to the specified region 412/volume of space.

To track the region in real time or semi-real time, the determined motion is continually updated. With reference to FIG. 3, after at least one subsequent image has been obtained at 310, the at least one subsequent image is used to update the determined motion and the method returns to block 303. At block 303, a new motion vector is determined based at least in part on the at least one subsequent image acquired at 310, and a new motion event time is predicted at block 306 based on the updated motion vector.

In this way, the motion of the region is tracked in real time using an optimised number of images. Thus, when the disclosed methods are used with an imaging apparatus comprises a source of ionising imaging radiation, a dose received by the patient is kept as low as possible for a given accuracy of motion tracking.

In continuously updating the motion vector (determined motion), times for a plurality of motion events are predicted and a plurality of subsequent images can be sequenced based on these times. The present methods may thus comprise receiving a first subsequent image, updating the determined motion of the region based at least in part on the first subsequent image and a first subsequent image capture time; predicting, based on the updated motion of the region, a second motion event time at which the at least one property associated with the motion will meet the at least one criterion; and determining, based on the second predicted motion event time, a second subsequent image capture time at which a second subsequent image should be captured.

The present methods are advantageous for several reasons. By determining a motion of the region and basing subsequent image capture times on predicted event times, rather than constantly taking images as has been done previously, optimal use of the number of images is made. This is beneficial in situations in which there is a 'cost' to taking images, for example when the images are taken by an imaging apparatus which makes use of ionising radiation. In this scenario, the cost may be a radiation dose applied to a patient, or else the radiation damage received by electronics when taking an image—this latter point is relevant in implementations using the method to determine when to take X-ray images in an airport security setting, for example.

To date, it has been thought that the use of kV images is not suitable to track a tumour or other target region of a patient in real time. It has been thought that the required frame rate and consequent radiation dose to the patient would be too high. However, by making use of motion estimation techniques to control when images are captured, this dose can be reduced to acceptable levels while maintaining both tracking accuracy and a high response time to changes in the motion of the tumour or other tracked region. Reducing the number of images taken by the kV images not only reduces the dose supplied to the patient, but also prolongs the lifetime of the imaging radiation detector.

Methods of the present disclosure have a fast response time to changes in the motion of the tumour. By predicting future event times based on a continuously updated motion vector which describes motion of the region, image sequencing times can be automatically updated as the patient's breathing speed changes. In turn, this allows radiotherapy treatment to be updated in real time to improve the efficacy of the treatment, by tracking the tumour as it moves or by gating application of the treatment beam, all with minimal kV imaging dose.

By imaging the tumour and basing subsequent image sequencing times on these images using motion estimation techniques, it is possible to directly track motion of the tumour or other region of the patient's body. This is more effective and more accurate than techniques which, for example, make use of a surrogate signal for the patient's breathing and rely on a potentially inaccurate correspondence mapping between the surrogate signal and the tumour movement.

Figure 5:
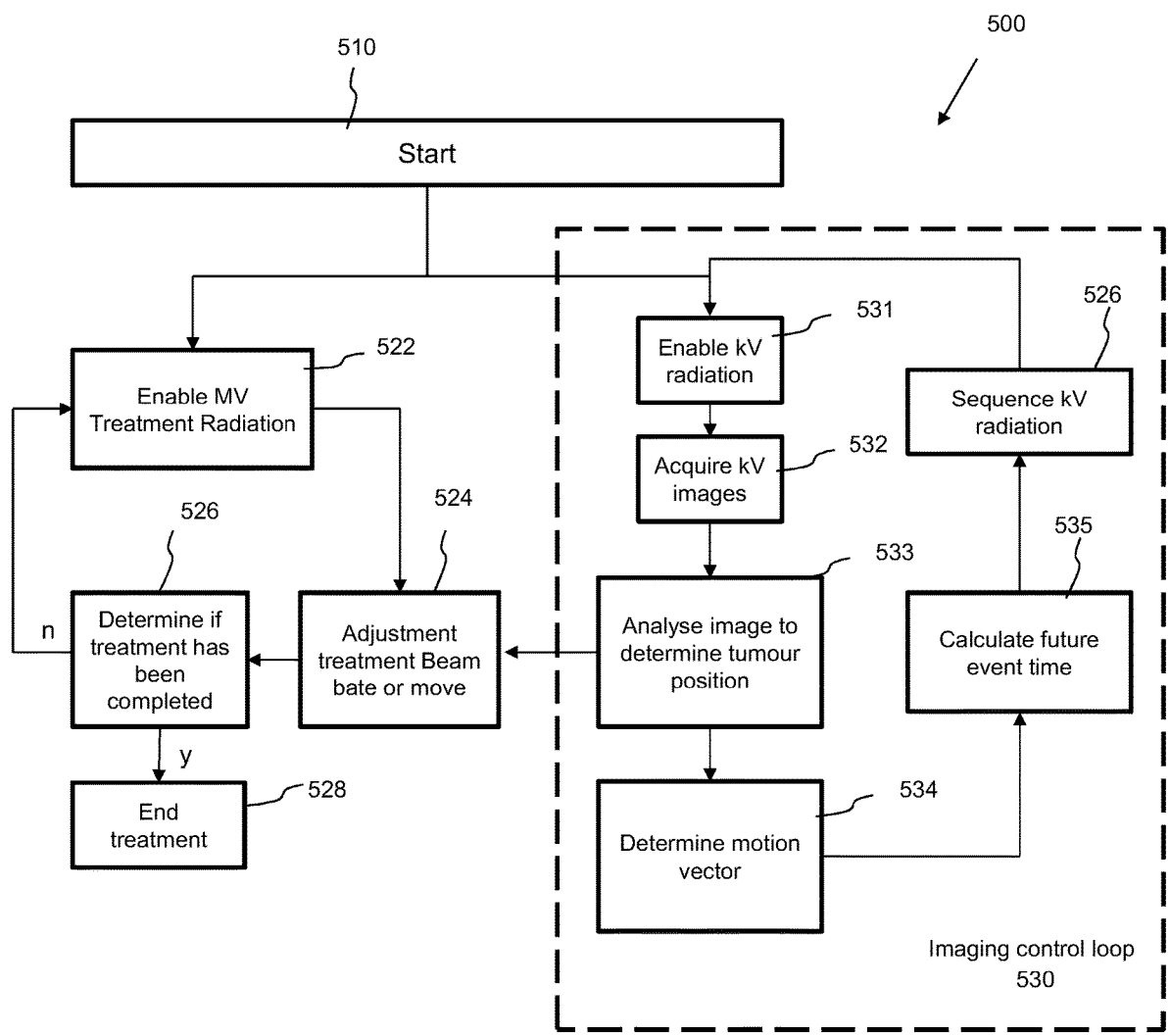
FIG. 5 depicts a control diagram according to the present disclosure.

FIG. 5 depicts a control diagram showing an implementation of the present disclosure. The process starts at 510. Therapeutic radiation is delivered to the patient at box 522. The treatment beam, e.g. the MV treatment radiation, is enabled. This involves control signals being sent from a controller to the source of radiation/beam generation system. At box 524, the radiotherapy treatment is updated. In particular, one or more parameters which affect the delivery of radiation to the patient may be adjusted, for example the treatment beam may be adjusted (e.g. in its intensity), gated (i.e. stopped or started), or moved (e.g. by virtue of steering magnets or via beam shaping/collimating apparatus such as an MLC). The adjustments or updates made at box 524 are performed based on information from imaging control loop 530 which will be discussed below. At box 526, it is determined whether treatment has completed or not. If so, the treatment is ended at box 528. If not, the treatment beam is enabled again and treatment continues at box 522 based on the parameters which have been adjusted or updated at box 524.

The manner in which treatment should be updated is informed by an imaging control loop 530, indicated in FIG. 5 via a dashed line. At step 531, control signals are sent from the controller to the imaging system in order to enable the imaging radiation. Images are acquired via the imaging system at box 532. The resulting image is analysed at box 533 to determine the position of the tumour, or other target region or region of interest. Based on the image, or images, acquired at box 532, the motion of the tumour is determined at box 534 in the form of a motion vector. Based on the determined motion vector, a future event time associated with the tumour is determined at box 535. As discussed elsewhere herein, this event time might be a time at which the location of the tumour meets a criterion, for example when the tumour will be located within the beam path of the treatment beam or when the tumour is at a turning point associated with the patient's respiratory cycle.

At box 526, future kV images are sequenced based on the event time calculated at box 535. As discussed elsewhere herein, the images may be sequenced to occur at the calculated future event time, or else may be sequenced to occur just before or after the future event time. This depends on the requirements of the radiotherapy treatment and the type of motion event predicted at box 535. Control signals are sent form the controller to the imaging system at box 531 to enable kV radiation and images are acquired at 532 at the sequenced times.

Optimising the number of images required in order to maintain a given tracking accuracy can be achieved using known optimisation techniques. A suitable loss or cost function can be prepared with the general aim of taking the minimum number of images for a given motion detection accuracy. The relationship between tracking accuracy and the number of images taken can be explored by using a phantom in the imaging/treatment volume of the radiotherapy device. The phantom is a moving phantom, which has a position which changes with time in a known way. By taking images of moving phantoms, it is possible to calibrate the method and explore the relationship between number of images taken and tracking accuracy. The resulting calibration information is used to inform the optimisation process.

Known methods of motion estimation may be used as part of the methods of the present application. Existing methods of motion estimation can be used to analyse the images received at block 301 of method 300. Algorithms can be used to create one or more motion vectors that represent the 2D translational motion of image areas from one frame to the next. Techniques may involve a motion search, in which two images are searched to find areas of the image that best match the region of the patient. The difference in the position of the two areas allows a determination of a motion vector which describes motion of the region between the relevant image capture times.

FIGS. 6a and 6b depict a plurality of images 610, 620 from which a motion vector may be determined. The first image 610 is taken at a first image capture time and depicts an object at a first location 612. The second image 620 is taken at a second image capture time and shows the same object at a second location 622. The displacement of the object can be determined, by analysing the first and second image 610, 620 using motion estimation techniques. In the example shown, the difference in two dimensions between the original position 612 and the subsequent position 622 can be described by a 2D vector as follows: (3, −3). A motion vector comprising velocity and direction information can be calculated using this displacement vector and the first and second image capture times.

In an implementation, Kalman filters may be used to determine the motion of a tumour or other region of the patient's body. A Kalman filter is a data fitting methodology which may be used to predict a tumour's future state, such as its future location and velocity, based on past state measurements. Kalman filters have been used in other areas for tracking moving objects in video and the skilled person will be familiar with such techniques. Advantages of using a Kalman filter include that the technique is light on memory and is fast and so can be used for real-time tracking.

Radiotherapy treatment typically involves rotating the gantry of the radiotherapy device during treatment such that the source of therapeutic radiation is rotated around the patient. This not only changes the angle from which the treatment beam is directed at the patient, but also the angle at which images can be taken. This means that, during radiotherapy treatment, it may be necessary to compensate for the gantry as a rotating frame of reference. As the gantry is rotated by different degrees to different gantry rotation angles (see FIGS. 1b-1e), everything in the view of the imaging apparatus is rotated by a set amount. Known motion estimation techniques can be used to compensate for this rotation.

Therefore, methods of the present disclosure may comprise determining motion of the region while the imaging apparatus is at a particular gantry rotation angle, predicting a motion event time and determining at least one subsequent image capture time, and then updating the determined motion based on images taken at a second, different gantry rotation angle.

In an example, the process makes use of a reference feature in the images in order to account for rotation of the gantry. For example, the average position or centre of mass of the patient could be used as a reference point. These features do not change position significantly between frames. Other possible reference features include an object in the patient that will not move with patient respiration, e.g. a suitable bone or other visible feature which will remain sufficiently stationary throughout the treatment. Other example reference features include the edge of the table/couch, or else markers placed in or on the table for the purpose of providing reference points.

Accounting for gantry rotation may alternatively or additionally comprise making use of information from the controller regarding the gantry rotation angle. For example, each image may be tagged with not only the time at which it was taken, but also the angle from which it was taken. This information can be fed into known motion estimation techniques in order to better track the tumour or other target region.

Accounting for gantry rotation may alternatively or additionally comprise developing and using a computer model of the patient's motion. This model can be used to calculate the expected change in patient projection for a given gantry angle.

The above implementations have been described by way of example only, and the described implementations and arrangements are to be considered in all respects only as illustrative and not restrictive. It will be appreciated that variations of the described implementations and arrangements may be made without departing from the scope of the invention.

At blocks 301 and 701, reference is made to receiving one or more images of a patient's body. While the discussion herein has focused on receiving at least two images and comparing the movement of the region between the two frames, it is possible to determine motion, including to determine a motion vector, using a single image, for example by analysing the degree of blur associated with the moving region. These techniques are known and do not need to be discussed herein.

While reference is made primarily to accounting for changes in position of a tumour as a patient breathes, the method is not limited to tracking either a tumour or to tracking motions associated with respiration. There are many other uses of the disclosed methods. When tracking a tumour or target region, the goal is to ensure the prescribed dose is applied to that region while dose to the surrounding regions is minimised. However, equivalently, an organ at risk (OAR) may be tracked using the present techniques. By tracking an OAR and by setting up the motion event and image sequencing criteria appropriately, it is possible to ensure dose applied to the OAR is minimised during treatment. Ensuring a low dose is provided to OARs is particularly important when tracking cardiac movements associated with the beating of a patient's heart, or when accounting for the movement of tissues near the throat as a patient moves their mouth and throat, for example if they swallow during treatment. In these sensitive areas, radiation therapy needs to be highly accurate, and reducing both treatment and imaging dose is particularly important.

Figure 7:
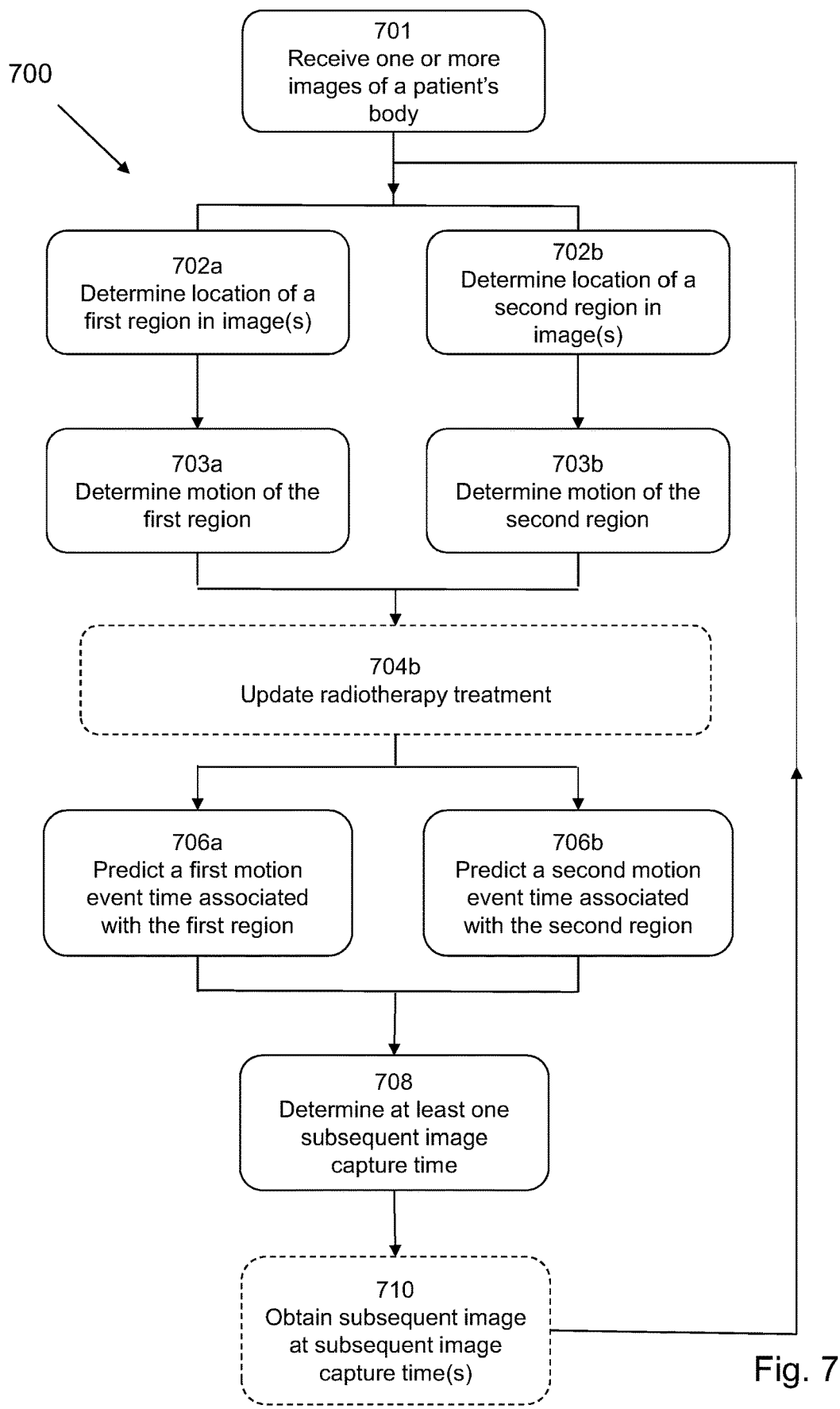
FIG. 7 depicts a disclosed method.

Methods of the present disclosure can be used to track multiple regions, including both OARs and target regions. FIG. 7 depicts a disclosed method 700 of tracking a plurality of regions of a patient's body. The method 700 is similar to the method 300 depicted in FIG. 3 and like numerals are used to indicate like steps. Reference is made to a first and a second region. The first region may be a tumour or target region, for example, and the second region may be an OAR. It will be appreciated that the method is not limited to just two regions and a plurality of regions may be tracked using the disclosed methods.

At 701, one or more images of a patient's body are received. The image, or images, are analysed in order to determine the location of the first region in the image(s) at box 702a and the location of the second region in the image(s) at box 702b. A motion of the first region of the patient's body is determined at box 703a. This may comprise determining a first motion vector associated with the first region. The image or images are similarly analysed at box 703b to determine the motion of a second region, for example to determine a second motion vector associated with the second region.

Radiotherapy treatment may be updated at box 704 based on any of: the determined location of the first region, the determined location of the second region, the determined motion of the first region, and the determined motion of the second region.

Motion event times are predicted for both the first and second region at boxes 706a and 706b. Though not shown in FIG. 7, the method 700 may further comprise determining and using first range of motion information for the first region and second range of motion information for the second region in the manner described above in relation to FIG. 3.

As described above, a motion event occurs when at least one property associated with the motion meets a criterion, or meets different criteria. The criteria for the first and second region may be the same, or may be different. For example, if the treatment beam is positioned to irradiate a particular region or volume of the patient, the relevant motion events being tracked may be the entering and exiting of either the first or the second region into this volume of the patient. The events may also be associated with the turning points of the patient's respiratory cycle, as described elsewhere herein.

At box 708, one or more subsequent image capture times are determined. The image capture times are determined, and sequenced, based on the first and second predicted motion event times. For example, images may be sequenced just before either of the regions are expected, based on their motion vectors, to enter or exit a volume of the patient being irradiated. Images taken at these times allow the radiotherapy treatment to be updated accurately at step 712. Suitable criteria can be established such that treatment radiation is applied to the patient only while the tumour is sufficiently located in the volume of the patient being irradiated, and such that if the OAR enters the volume to a specified degree the beam is gated.

For example, a motion event may occur when a property of the motion changes in a specified way. For example, the velocity might change such that a velocity criterion is met. The criterion could relate to either or both, of the speed or direction of movement.

Finally, images are obtained at the determined subsequent image capture times, and the process returns to bocks 702a and 702b at which the locations of the first and second region are determined in the subsequent images. As with FIG. 3, the process is continued to ensure the motion vectors or other parameters associated with motion are kept up to date.

While reference has been made to obtaining images using a kV imaging system such as a CT imaging apparatus, the method is not limited to use with such hardware. For example, in a radiotherapy environment, so-called 'portal' images obtained via an electronic portal imaging device (EPID) may be used. These images may be used as an alternative, or in addition to using kV images.

In an example implementation, a plurality of images are received at block 301 of method 300, where one or more of the images are kV images obtained via a kV imaging device and one or more of the images are portal images obtained via an EPID. It is possible to determine the location of the region of interest in each of these images and use these positions to allow determination of the motion vector.

This implementation is particularly useful for radiotherapy devices comprising both kV imaging systems and EPIDs. The location of the region as located in images taken by these different imaging modalities can be converted into a common reference frame. For example, the location of the region can be described using the room-coordinates. By making use of images taken by different imaging modalities, and/or different imaging systems oriented at different gantry angles of the radiotherapy device, more accurate motion vectors can be determined.

Validating a Patient Movement Model

In a disclosed implementation, a surrogate signal may be used to track internal movement of the region of the patient (e.g. a tumour). The surrogate signal may be, for example, a signal from a resistance band around a patient's chest, or the output from a surface scanning system (for example an optical surface scanning system). The surrogate signal is not directly representative of the movement of the region of interest inside the patient, however it is possible to generate a patient movement model which links, or maps, the surrogate signal to this internal movement.

In an example, a surface scanning system is used to monitor patient movement while the patient is positioned on the patient positioning surface of the radiotherapy device. The monitored movement includes the patient's respiratory motion. The output of the surface scanning system is representative of the movement of the patient's surface or 'external' anatomy. During this time, kV images (e.g. X-ray and/or CT images) or MR images are taken which show the region of interest. In contrast with the surface scanning system output, these images show internal patient anatomy. By continuously monitoring the patient using the surface tracking system while kV images are taken, it is possible to generate a patient movement model which links the movement of the patient's surface anatomy with the movement of the patient's internal anatomy. In particular, the movement of the patient's surface anatomy, as determined by the surface scanning system, can be used as a surrogate signal to determine the movement of the internal region of interest.

Once the patient movement model has been generated, it is no longer necessary to take kV images in order to determine, or predict, the location of the region of interest inside the patient. The surrogate signal (e.g. output of the surface scanning system) can be used to determine the location of the region of interest, either at a current time or at a future time. The surrogate signal may be used to determine/predict when a tumour will be positioned in the path of a radiotherapy beam. As such, the surrogate signal may be used to adapt/update/modify radiotherapy treatment in real time. The signal may be used to update radiotherapy treatment, for example by adjusting one or more parameters which affect the delivery of radiation to the patient, in any of the ways described elsewhere herein. By building a patient movement model in this way, the internal motion of the tumour can be tracked using the surrogate signal without having to continually take kV images. Hence, the dose delivered to the patient can be beneficially reduced.

However, for optimal results, the accuracy of the patient movement model should be validated throughout treatment to ensure good agreement between the expected position of the tumour or other region of interest (as predicted by the patient movement model) and the actual position of the tumour (which may be determined by taking a kV or MRI image such as a projection image). Accordingly, methods of the present disclosure can be used to determine the optimal time to take a kV image in order to validate a patient movement model.

Once a motion of the region has been determined (e.g. once a motion vector associated with the tumour has been determined) based on one or more initial kV images, that motion vector can be used as the basis for updating the patient movement model. In an example, a motion event time is determined. At this motion event time, it is predicted that a property associated with the motion or position of the region will meet a criterion (e.g. a time at which the tumour is at a turning point of its respiratory motion). This determination may be determined based on kV images, as described elsewhere herein. A subsequent kV image can then be scheduled based on knowledge of the predicted motion event time, for example at that time or at a time close to the motion event time. Once the subsequent image is taken, the position of the tumour in the subsequent image can be compared with the position of the tumour as predicted by the patient movement model. The patient movement model can then be updated, if needed, based on the level of agreement between the predicted position (determined by the model) and the actual position at the (determined by the kV image). The model can be updated based on the difference between expected and actual position of the tumour at the time the subsequent kV image was taken, as well as the output from the surface scanning system at that time. In contrast, if the positions agree within a threshold degree of tolerance, then the patient movement model is validated, and no updates are required.

It has been found that patient movement models based on surrogate signals tend to predict the movement of a tumour very accurately as the tumour moves between the maximum and minimum of its range of motion (for example between the maximum and minimum of the patient's respiratory cycle). However, the timing and duration of the turning points in the cycle can vary with time, and th accuracy of the model will reduce with time unless it is updated. By taking kV images at or around these turning points, kV images for validating the model are taken at the time when the greatest benefit can be provided to the validation process. In other words, by determining one or more subsequent image capture times based on when the region of interest will be positioned, for example, at a particular point in its range of motion, subsequent images can be scheduled for times when the greatest benefit to the validation process can be achieved, while still keeping the overall dosage delivered to the patient to a minimum.

The tracking of a region of a patient using a patient movement model, and the validation of the model, can be described in relation to FIG. 3. At 301, one or more images of a region of the patient's body are received. In an implementation, a plurality of images is received which are taken throughout the range of motion of the region, e.g. throughout the patient's respiratory cycle. These images are taken with an imaging system comprising a source of imaging radiation. A surrogate signal is also received (not shown in the flowchart) which is indicative of the movement of the patient's external/surface anatomy. The surrogate signal has been acquired during the same time period as the plurality of images were taken. At 302, the location of the region in the images is determined, for example using auto-segmentation techniques. At block 303, the motion of the region is determined. This may comprise generating a patient movement model based on the one or more initial images and the surrogate signal. The patient movement model enables estimation of the motion or position of the region, or else some other property associated with the motion of position of the region, as a function of the surrogate signal and/or as a function of time. In other words, using the patient movement model, it is possible to estimate the motion or position of the region at a later time.

Now the patient movement model has been generated, it is possible to monitor the surrogate signal and determine the motion or position of the region either in real-time, or in the near future, with high accuracy. Accordingly, the surrogate signal may be used as the basis for updating a radiotherapy treatment plan at block 304. The surrogate signal may be used as a trigger to gate the beam, adjust the beam shape, or update the treatment in any other way described herein.

At block 306, a motion event time is predicted using the determined motion, and in particular using the patient movement model. One of the aims of this implementation of the method is to check the accuracy and validity of the patient movement model, and the times where the model is likely to be least accurate are at the turning points of the patient respiratory cycle. Accordingly, in an example, the predicted motion event time may be a time at which, according to the patient movement model, the region will be positioned at a turning point in the patient's respiratory cycle. This may be at a maximum or minimum of the region's range of motion.

At block 308, one or more subsequent image capture times are determined. These image capture times are determined based on the motion event time predicted at block 306. For example, it may be determined that a subsequent image should be captured at, or just before, the turning point in the patient's respiratory cycle. At block 310, subsequent images are obtained at the image capture times determined at block 308.

The method then returns to block 302, at which the location, position, or other property associated with the motion or position of the region is determined in the subsequent image or images. Again, this may be achieved using auto-segmentation or contouring techniques or other standard image analysis techniques. This determined position allows the patient movement model to be validated and updated, if necessary. To validate the model, the method further comprises using the patient movement model to estimate the location (or else another property associated with the motion or position of the region) at the subsequent image capture times. Comparing the estimated position (determined using the patient movement model) with the determined or measured position (determined using the subsequent images) allows a difference between the locations to be determined, and the model can be updated based on this difference.

If the difference, i.e. the level of agreement between the model and the measured result, is large, then a frequency of kV images to be scheduled can be increased in order to provide more data with which to update the model. If the difference is small, i.e. if the model is accurate, then a frequency of future kV images may be reduced. In this way, the patient movement model is kept accurate while minimising the number of kV images required, hence reducing overall radiation dose to the patient. If the surrogate signal, e.g. the surface tracking signal, is used to guide radiation therapy, then the treatment can be optimised using the surrogate signal without subjecting the patient to a high dose of imaging radiation.

While reference is made to radiation therapy, the present methods of tracking a region have several different uses. It is useful to analyse how regions of the patient's body move in real-time or semi-real time for diagnostic reasons. The methods may also have applications outside the field of medicine. For example, disclosed methods may have security applications, for example when determining when to take images as a person walks through a scanner, or when taking images of the content of luggage at an airport using penetrating waves.

The above implementations have been described by way of example only, and the described implementations and arrangements are to be considered in all respects only as illustrative and not restrictive. It will be appreciated that variations of the described implementations and arrangements may be made without departing from the scope of the invention.

The invention claimed is:

1. A medical device for tracking movement of a region of a body of a patient, the region of the body of the patient having a range of motion, the medical device comprising:
a controller, the controller comprising controller circuitry configured to:
determine a motion of the region based on one or more initial images depicting at least part of the region;
predict, based on the determined motion, a motion event time at which at least one property associated with the motion or a position of the region will meet at least one criterion, wherein the at least one criterion comprises the region being at a particular location in its range of motion; and
determine, based on the predicted motion event time, at least one subsequent image capture time at which at least one subsequent image should be captured.

2. The medical device of claim 1, further comprising:
an imaging apparatus, wherein the one or more initial images are obtained using the imaging apparatus.

3. The medical device of claim 2, wherein the imaging apparatus comprises:
a source of imaging radiation.

4. The medical device of claim 2, the controller circuitry being configured to:
send one or more instructions to the imaging apparatus to obtain the at least one subsequent image at the determined at least one subsequent image capture time.

5. The medical device of claim 1, the controller circuitry being further configured to:
determine the location of the region in the one or more initial images; and
determine the motion of the region based on the determined location of the region in the one or more initial images and image capture times associated with the one or more initial images.

6. The medical device of claim 1, wherein the at least one property associated with the motion or position of the region comprises one or more of:

a direction of motion; or
a speed of motion;
wherein predicting a motion event time comprises predicting when the at least one property will change by a threshold amount.

7. The medical device of claim 1, wherein the medical device is a radiotherapy device comprising a source of therapeutic radiation, and the controller circuitry is further configured to:
update a radiotherapy treatment based on at least one of the determined motion or a location of the region in the subsequent images, wherein updating the radiotherapy treatment comprises adjusting one or more parameters that affects delivery of radiation to the patient.

8. The medical device of claim 7, the controller circuitry being configured to:
control at least one of the following based on at least one of the determined motion of the region or the location of the region in the at least one subsequent image:
a gating of a radiation beam;
a shape of the beam via adjusting beam shaping apparatus;
a direction of the beam; and
a movement of a patient supporting system.

9. The medical device of claim 7, wherein determining the motion of the region comprises:
generating a patient movement model based on the one or more initial images and a surrogate signal, the surrogate signal being indicative of movement of a surface anatomy of the patient, and wherein the patient movement model enables estimation of the at least one property associated with the motion or position of the region as a function of the surrogate signal and/or as a function of time.

10. The medical device of claim 9, wherein predicting the motion event time based on the determined motion comprises predicting the motion event time using the patient movement model.

11. The medical device of claim 9, wherein the controller circuitry is further configured to:
estimate, using the patient movement model, the at least one property associated with the motion or position of the region at the at least one subsequent image capture time;
receive the at least one subsequent image;
determine the at least one property associated with the motion or position of the region at the at least one subsequent image capture time using the at least one subsequent image; and
update the patient movement model based on a difference between the estimated and the determined at least one property.

12. The medical device of claim 9, further comprising:
a surface scanner configured to scan the patient's surface anatomy to generate the surrogate signal, wherein the radiotherapy treatment is updated based on the surrogate signal and patient movement model.

13. The medical device of claim 1, wherein at least one of:
the at least one property includes the position of the region, and the criterion comprises the region entering, or overlapping by a threshold amount, a predefined region within a treatment volume of the medical device; or
determining the motion of the region comprises determining a motion vector for the region.

14. The medical device of claim 1, the controller circuitry being further configured to at least one of:
   receive the at least one subsequent image;
   determine an updated motion of the region based on the at least one subsequent image;
   predict, based on the updated motion, a second motion event time at which at least one property associated with the motion or position of the region will meet the at least one criterion; or
   determine, based on the predicted second motion event time, at least one further subsequent image capture time at which a further subsequent image should be captured.

15. The medical device of claim 1, further comprising:
   an imaging apparatus comprising a source of imaging radiation and configured to obtain the one or more initial images and the at least one subsequent image.

16. The medical device of claim 1, wherein the motion event time is associated with a first region, and the controller circuitry is further configured to:
   determine a motion of a second region of the body of the patient based on the one or more initial images;
   predict, based on the determined motion of the second region, a motion event time associated with the second region, at which time at least one property associated with the motion or position of the second region will meet at least one criterion associated with the second region; and
   determine, based on the predicted motion event time associated with the first region and the predicted motion event time associated with the second region, the at least one subsequent image capture time at which the subsequent image should be captured.

17. The medical device of claim 1, wherein the range of motion is associated with a respiratory cycle of the patient and, wherein the particular location in the range of motion of the region is a turning point of the respiratory cycle.

18. The medical device of claim 1, wherein the range of motion is associated with a respiratory cycle of the patient.

19. The medical device of claim 18, the controller circuitry being further configured to:
   receive a plurality of images, each image of the plurality of images depicting at least part of the region and being taken at a different point in the respiratory cycle of the patient; and
   determine the range of motion of the region based on the plurality of images.

20. A method for tracking movement of a region of a body of a patient performable by a medical device, the region of the body of the patient having a range of motion, the method comprising:
   determining a motion of the region based on one or more initial images depicting at least part of the region;
   predicting, based on the determined motion, a motion event time at which at least one property associated with the motion or position of the region will meet at least one criterion, wherein the at least one criterion comprises the region being located at a particular point in its range of motion; and
   determining, based on the predicted motion event time, at least one subsequent image capture time at which at least one subsequent image should be captured.

21. A non-transitory computer readable medium comprising computer executable instructions which, when executed by a processor of the computer, cause the computer to:
   determine a motion of a region of a body of a patient based on one or more initial images depicting at least part of the region;
   predict, based on the determined motion, a motion event time at which at least one property associated with the motion or position of the region will meet at least one criterion, wherein the at least one criterion comprises the region being located at a particular point in its range of motion; and
   determine, based on the predicted motion event time, at least one subsequent image capture time at which at least one subsequent image should be captured.

22. A medical device for tracking movement of an internal region of a body of a patient, the medical device comprising a controller, the controller including controller circuitry configured to:
   generate a patient movement model based on:
      a plurality of images depicting at least part of the region, the plurality of images being taken using an imaging apparatus comprising a source of imaging radiation; and
      a surrogate signal indicative of movement of a surface anatomy of the patient;
   wherein the patient movement model enables estimation of a position of the region as a function of the surrogate signal and/or as a function of time; the controller further being configured to:
      estimate, using the patient movement model, a motion event time at which the position of the region will meet at least one criterion, wherein the at least one criterion comprises the region being at a particular location in its range of motion; and
      determine, based on the estimated motion event time, at least one subsequent image capture time at which at least one subsequent image should be captured using the imaging apparatus.

* * * * *